United States Patent
Lee (10) Patent No.: US 11,187,788 B2
(45) Date of Patent: Nov. 30, 2021

(54) NONLINEAR ARRAY ANTENNA RADAR AND METHOD THEREOF

(71) Applicant: MANDO CORPORATION, Gyeonggi-do (KR)

(72) Inventor: Han Byul Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 309 days.

(21) Appl. No.: 16/373,618

(22) Filed: Apr. 2, 2019

(65) Prior Publication Data
US 2019/0310346 A1 Oct. 10, 2019

(30) Foreign Application Priority Data
Apr. 9, 2018 (KR) .......................... 10-2018-0040890

(51) Int. Cl.
*G01S 7/41* (2006.01)
*G01S 13/86* (2006.01)
(Continued)

(52) U.S. Cl.
CPC ............ *G01S 7/412* (2013.01); *G01S 13/867* (2013.01); *G01S 13/931* (2013.01)

(58) Field of Classification Search
CPC .... G01S 13/003; G01S 7/2923; G01S 7/2883; G01S 2013/0236
See application file for complete search history.

(56) References Cited

U.S. PATENT DOCUMENTS 8,264,399 B2 * 9/2012 Shinomiya ............ G01S 13/003
342/74
9,354,299 B2 * 5/2016 Ishimori ............... G01S 13/931
(Continued)

FOREIGN PATENT DOCUMENTS

JP     11-344560      12/1999
JP    2005-257384     9/2005
(Continued)

OTHER PUBLICATIONS

Office Action dated Dec. 16, 2019 for Korean Application No. 10-2018-0040890 and its English machine translation by Google Translate.

*Primary Examiner* — Bernarr E Gregory
(74) *Attorney, Agent, or Firm* — Ladas & Parry, LLP (57) ABSTRACT

The present disclosure relates to a array radar system. More particularly, to a technique for determining a ghost target in a radar equipped with a nonlinear array antenna. There is provided a radar apparatus including a receiver configured to receive real non-linear array signals of N channels through N channel non-linear array antennas arranged at mutually different intervals, a signal generator configured to generate virtual non-linear array signals of M channels capable of spacing equal intervals between the adjacent channels together with the N channels based on N real channel non-linear array signals, and configured to generate virtual linear array signals of M+N channels including the real non-linear array signals of N channels and the virtual non-linear array signals of M channels M channels, and a determiner configured to determine a ghost target based on the virtual linear array signals of M+N channels.

17 Claims, 9 Drawing Sheets

(51) Int. Cl.
  *G01S 13/931* (2020.01)
  *G01S 13/00* (2006.01)

(56) References Cited

U.S. PATENT DOCUMENTS

| | | | | |
|---|---|---|---|---|
| 9,689,967 B1* | 6/2017 | Stark | .................... | G01S 13/931 |
| 9,791,551 B1* | 10/2017 | Eshraghi | ................ | G01S 13/931 |
| 10,048,366 B1* | 8/2018 | Hong | .................... | G01S 13/003 |
| 10,261,172 B2* | 4/2019 | Lim | ...................... | G01S 13/931 |
| 10,451,724 B2* | 10/2019 | Shimizu | ................ | G01S 13/931 |
| 2008/0258964 A1* | 10/2008 | Schoeberl | ............ | G01S 13/931 |
| | | | | 342/189 |
| 2013/0307718 A1* | 11/2013 | Aoki | .................... | G01S 13/931 |
| | | | | 342/61 |
| 2016/0025839 A1* | 1/2016 | Trummer | ................ | G01S 13/42 |
| | | | | 342/109 |
| 2017/0315221 A1* | 11/2017 | Cohen | .................... | G01S 13/42 |

FOREIGN PATENT DOCUMENTS

| | | | | |
|---|---|---|---|---|
| KR | 10-2017-0069476 | | 6/2017 | |
| WO | WO2017/218876 A1 * | 12/2017 | ........... | G01S 13/931 |

* cited by examiner

NONLINEAR ARRAY ANTENNA RADAR AND METHOD THEREOF

CROSS REFERENCE TO RELATED APPLICATION

This application claims priority from Korean Patent Application No. 10-2018-0040890, filed on Apr. 9, 2018, which is hereby incorporated by reference for all purposes as if fully set forth herein.

BACKGROUND OF THE INVENTION

1. Field of the Invention

The present disclosure relates to a radar, and more particularly, to techniques for determining ghost targets in a radar with a non-linear array antenna.

2. Description of the Prior Art

The angle of the target in the radar apparatus may be estimated from the array antenna signal processing. In order to design a low-cost, small-sized radar, high-resolution angular estimation performance should be ensured even when the number of array antennas is limited.

Meanwhile, the angular resolution is proportional to the aperture size of the array antenna provided in the radar. If the array spacing interval between the array antenna is greater than half the wavelength of the wavelength corresponding to the center frequency of the radar signal, two different angular components generating the same covariance matrix are generated.

This may be expressed as the spatial ambiguity that obscures the direction-of-arrival estimation of the radio waves and finally generates a grating lobe ghost.

As a result, the angular resolution of the radar may be in a trade-off relationship with the spatial ambiguity, and nonlinear array antennas considering this relationship are recently being studied.

However, there still exists a ghost target problem due to the grating lobe ghost even in such a non-linear array configuration.

SUMMARY OF THE INVENTION

For this background, an object of the present disclosure is to provide a technique for determining the ghost target more precisely in a radar with the non-linear array antenna.

In accordance with an aspect of the present disclosure, there is provided a radar apparatus including: a receiver configured to receive real non-linear array signals of N channels through N channel non-linear array antennas arranged at mutually different intervals; a signal generator configured to generate virtual non-linear array signals of M channels capable of spacing equal intervals between the adjacent channels together with the N channels based on N real channel non-linear array signals, and configured to generate virtual linear array signals of M+N channels including the real non-linear array signals of N channels and the virtual non-linear array signals of M channels M channels; and a determiner configured to determine a ghost target based on the virtual linear array signals of M+N channels In accordance with another aspect of the present disclosure, there is provided a method for controlling a radar with a nonlinear array antenna including: receiving real non-linear array signals of N channels through N channel non-linear array antennas arranged at mutually different intervals; generating virtual non-linear array signals of M channels capable of spacing equal intervals between the adjacent channels together with the N channels based on N real channel non-linear array signals, and generating virtual linear array signals of M+N channels including the real non-linear array signals of N channels and the virtual non-linear array signals of M channels M channels; and determining a ghost target based on the virtual linear array signals of M+N channels.

According to the embodiments of the present disclosure, driver assistance driving or autonomous driving of the vehicle can be performed more safely, by determining the ghost target more precisely in the non-linear array radar.

DETAILED DESCRIPTION OF THE EXEMPLARY EMBODIMENTS

Hereinafter, embodiments of the present disclosure will be described with reference to exemplary diagrams. In the specification, in adding reference numerals to components throughout the drawings, it should be noted that like reference numerals designate like components even though components are shown in different drawings. Further, in describing embodiments of the present disclosure, well-known functions or constructions will not be described in detail since they may unnecessarily obscure the understanding of the present disclosure.

Further, terms such as 'first', 'second', 'A', 'B', '(a)', and '(b)' may be used for describing components of the present disclosure. These terms are used only for discriminating the components from other components, so the essence or order of the components indicated by those terms is not limited. It should be understood that when one element is referred to as being "connected to", "combined with" or "coupled to" another element, it may be connected directly to or coupled directly to another element, or another element may be "connected", "combined", or "coupled" between them.

Hereinafter, preferred embodiments of the present disclosure will be described in detail with reference to the accompanying drawings. In the following description with reference to the accompanying drawings, the same or corresponding components may be denoted by the same reference numerals, and a duplicate description thereof may be omitted.

The radar according to the present disclosure may include at least one radar sensor unit, for example, a front radar sensor mounted in front of the vehicle, a rear radar sensor mounted at the rear of the vehicle, and lateral radar or lateral-rear radar mounted in sides of the vehicle.

Figure 6:
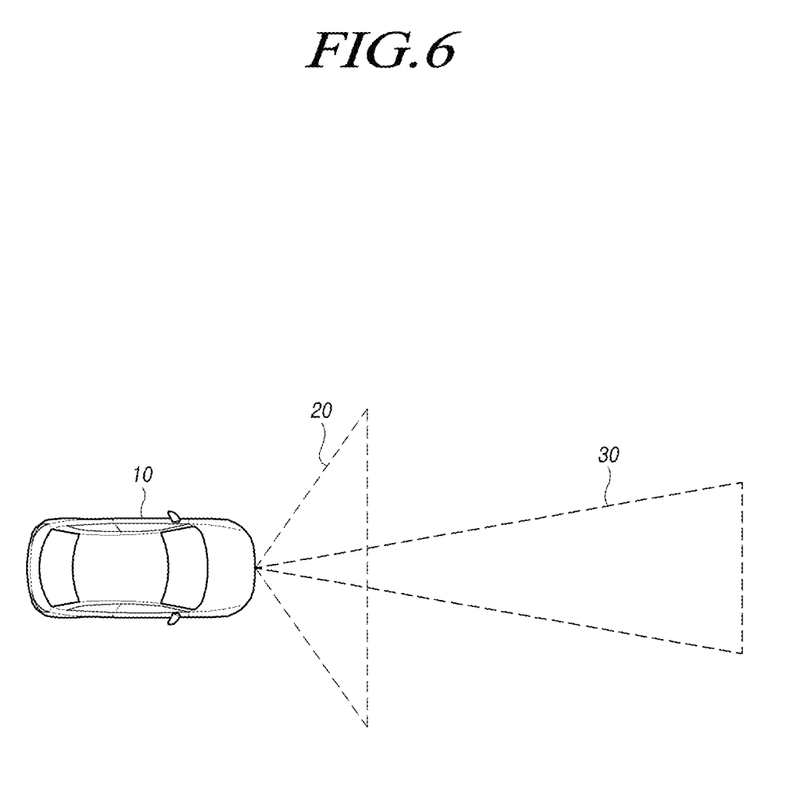
FIG. 6 illustrates the detection area of the radar mounted in the vehicle related to this disclosure.

FIG. 6 illustrates an example of a radar mounted in front of a vehicle related to this disclosure. The radar may include an electronic control unit (ECU) or processor for analyzing the transmission and receiving signals and processing data, thereby detecting information about the object. Data transmission or signal communication from the radar sensor to the ECU may utilize a communication link such as an appropriate vehicle network bus or the like.

The radar according to one embodiment of the present disclosure may include at least one transmission antenna for transmitting a radar signal and at least one receiving antenna for receiving a reflection signal reflected from the object. The radar that detects an object in the front of the vehicle may include a long-range antenna for detecting objects located at a distance and a short-range antenna for detecting objects located at a short range.

As shown in FIG. 6, the short-range transmission antenna may be set to have a short-range detection area 20 of a wide sensing angle so as to be able to sense a nearby object. The long-range transmission antenna may be set to have a long-range detection area 30 with a narrow sensing angle so as to be able to sense an object at a distance.

As shown in FIG. 6, the vehicle 10 may detect an object in the long-range detection area 30 by using the long-range transmission antenna and may detect an object in the short-range detection area 20 by using the short-range transmission antenna. Since the circumstances to detect both object at a distance and object in short range from the vehicle 10 is required, there is a need for both of these detection areas. For example, a long-range antenna with a narrow and long detection range is required to overtake the other vehicle in front of the host vehicle, and a short-range antenna with a wide and short detection range is required to prevent collision with pedestrians or other vehicles in the vicinity of the host vehicle.

The radar sensor according to the present embodiment may adopt a multi-dimensional antenna arrangement and a signal transmission/reception scheme based on a multiple input multiple output (MIMO) to form a virtual antenna aperture larger than an actual antenna aperture.

For example, a two-dimensional antenna array may be used to ensure horizontal and vertical angular accuracy and resolution above a certain level. In the case of the two-dimensional antenna array, signals are transmitted and received by two scans in the horizontal and vertical directions separately (time-multiplexed), and MIMO may be used separately from the two-dimensional radar horizontal and vertical scans (time multiplexing).

Figure 7:
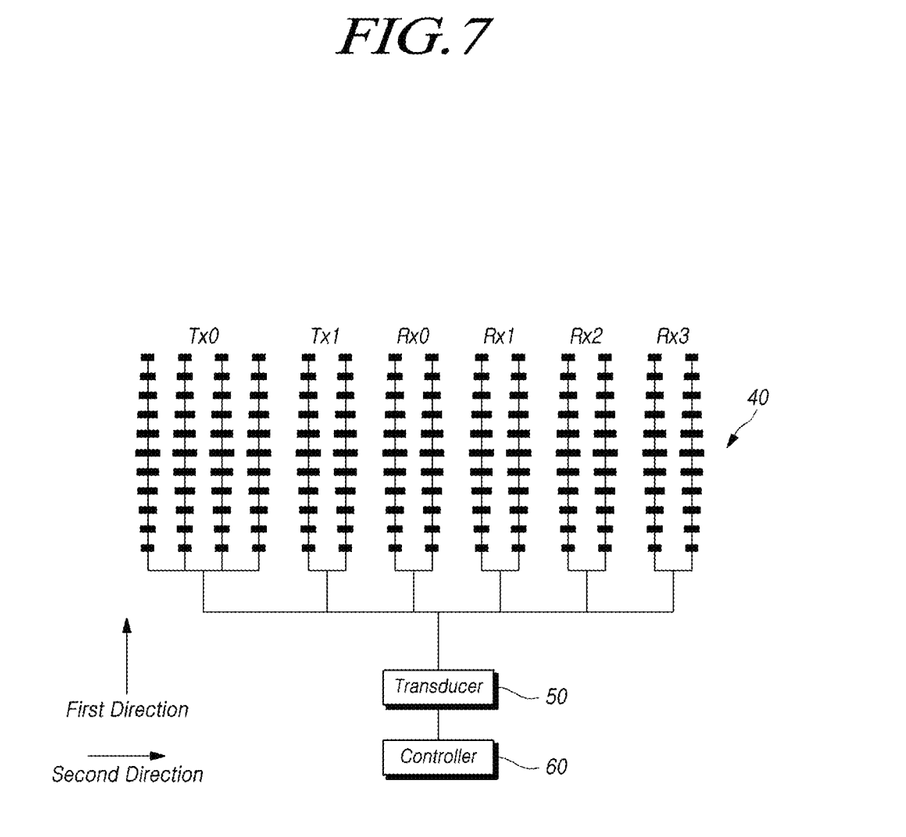
FIG. 7 illustrates the configuration of the radar apparatus of the vehicle for long-range detection the short-range detection according to the present disclosure.

Referring to FIG. 7, there is shown an example of the radar including the short-range antenna and a long-range antenna in connection with the present disclosure. The antenna unit 40 of the radar may include the long-range antenna and the short-range antenna. The long-range antenna may include the long-range transmission antenna Tx0 for outputting a long-range transmission signal and the long-range receiving antenna Rx1, Rx2 and Rx3 for receiving a reflection signal in which the long-range transmission signal is reflected at the object. The short-range antenna includes the short-range transmission antenna Tx1 for outputting a short-range transmission signal and a short-range receiving antenna Rx0 for receiving a reflection signal in which the short-distance transmission signal is reflected at the object.

The short-range receiving antenna Rx0 and the long-range receiving antennas Rx1, Rx2, and Rx3 may be shared during detection of both long-range target and short-range target. In this case, all of the four receiving antennas may receive the reflection signal of the long-range transmission signal at the time of the long-range detection and the reflection signal of the short-range transmission signal at the time of the short-range detection.

At this case, each of the long-range transmission antenna, the long-range receiving antenna, the short-range transmission antenna and the short-range receiving antenna may include at least one patch antenna. Meanwhile, in order to appropriately suppress the directionality of the antenna signal with respect to the vertical direction, two or more patch antennas may be serially connected in a first direction perpendicular to the ground, which may be referred to as an array antenna.

FIG. 7 discloses the array antenna in which each of the array antennas is composed of 10 patch antennas, but this is only an example and not limited thereto. The number, size and shape of the patch antennas included in each array antenna may be differently implemented as required.

The radar may include a transducer 50 which transmits the transmission signal through the long-range transmission antenna and the short-range transmission antenna and receives the receiving signal from the long-range receiving antenna and the short-range receiving antenna. The transducer 50 may include a switching device for selecting the transmission antenna and the receiving antenna according to the detection mode.

The controller 60 may process the reflection signal received through the receiving antenna to acquire information about the object in the detection area. For example, the controller 60 may acquire the target information about the target object by using a correlation analysis between a reflection signal received through the receiving antenna and a transmission signal transmitted through the transmission antenna.

In addition, two or more array antennas may be arranged horizontally with the ground at equal intervals in order to appropriately suppress the directionality of the antenna signal with respect to the horizontal direction. At this case, array antennas powered by one feeding line may be considered as connected to the same one channel. For example, referring to FIG. 7, four array antennas constitute a long-range transmission antenna Tx0 as one channel. Also, the two array antennas constitute the short-range transmission antenna Tx1 as one channel. In addition, the two array antennas constitute a short-range receiving antenna Rx0 as one channel, and the six array antennas constitute the long-range receiving antennas Rx1, Rx2 and Rx3 with three channels each having two array antennas.

In order to improve the angular resolution in the horizontal direction, it is necessary that the left end and the right end of the receiving antenna are arranged to be distant from each other in the entire channel. For this purpose, it is necessary to increase the number of channels of receiving antennas or sufficiently increase the spacing of the array antennas. However, if the spacing of the array antennas is wider than half of the wavelength of the transmission signal, the directionality of the antenna signal may be deteriorated thereby it is necessary to efficiently adjust the number of channels, the number of array antennas and the interval of the array antennas.

In addition, a non-linear array antenna in which the intervals of array antennas are arranged at unequal intervals has been introduced in order to improve the angular resolution. However, even in such a nonlinear array antenna, a ghost target may still be detected due to the grating lobe, and therefore it is necessary to more accurately detect the ghost target.

Hereinafter, the vehicle radar and a control method thereof according to embodiments of the present disclosure will be described with reference to the accompanying drawings.

Figure 1:
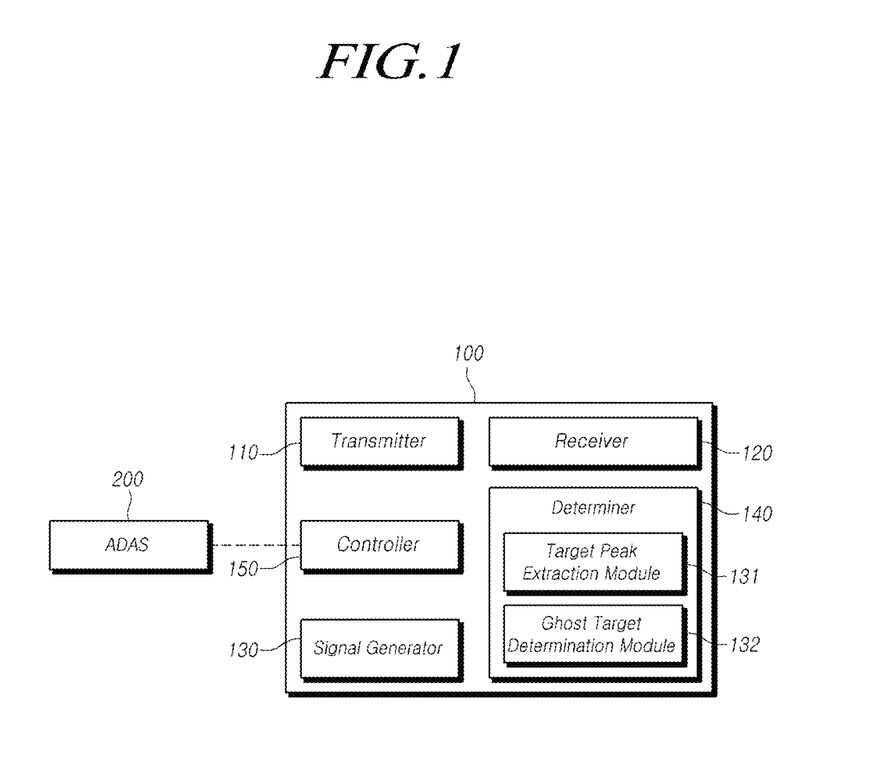
FIG. 1 is a block diagram of a radar system with a nonlinear array antenna according to one embodiment of the present disclosure.

FIG. 1 is a block diagram of a radar system with a nonlinear array antenna according to one embodiment of the present disclosure.

Referring to FIG. 1, the radar sensor or radar according to the present embodiment may include a transmitter 110, a receiver 120, a signal generator 130, a determiner 140 and a controller 150.

The transmitter 110 may transmit a radar signal or a transmission signal. Specifically, the transmitter 110 may transmit a radar signal through a non-linear array transmission antenna (not shown) included in the transmitter 110 according to a transmission pulse.

The receiver 120 may receive the receiving signal or the reflection signal. Specifically, the receiver 120 may receive the reflection signal reflected from the object by the radar signal transmitted from the transmitter 110 through a non-linear array receiving antenna (FIG. 2A and FIG. 2B) included in the receiver 120. This reflection signal may be a real non-linear array signal.

The signal generator 130 may generate the virtual linear array signal based on the reflection signal. Specifically, the signal generator 130 generates the virtual non-linear array signal based on the real non-linear array signal received by the receiver 120.

For example, if the rear non-linear array signal is received through the non-linear array antenna of four channels spaced at λ, 1.5λ, and 2λ, the rear non-linear array signal may be four channel signals of 0λ, 1λ, 2.5λ and 4.5λ. At this case, the signal generator 130 may generate 6-channel virtual non-linear array signals of 0.5λ, 1.5λ, 2λ, 3λ, 3.5λ and 4λ based on the real non-linear array signals. Finally, the signal generator 130 may generate 10-channel virtual linear array signals of 0λ, 0.5λ, 1λ, 1.5λ, 2λ, 2.5λ, 3λ, 3.5λ, 4λ and 4.5λ by using the real non-linear array signals 0λ, 1λ, 2.5λ and 4.5λ and the virtual non-linear array signals 0.5λ, 1.5λ, 2λ, 3λ, 3.5λ and 4λ.

That is, if the real non-linear array signal received through the receiver 120 is N channels and the virtual non-linear array signal generated based on the real non-linear array signal is M channels, the signal generator 130 may generate the virtual linear array signal of N+M channels in total. (Here N and M are natural numbers of 2 or more)

The determiner 140 may determine the ghost target based on the virtual linear array signal of N+M channels. In this case, the determiner 140 may include a target peak extraction module 131 for extracting a target peak from the virtual linear array signal and a ghost target determination module 132 for determining the ghost target and the real target from the target peaks.

In one embodiment, the target peak extraction module 131 may extract the target peak through a Bartlett Beamforming process as shown in Equation 1 below using a fast Fourier transform (FFT) or the like.

Digital Beamforming: FFT mag=$|a_i^H(\theta_i) \cdot x|$

Bartlett Beamforming: $P_{BF}(\theta)=|a_H(\theta) \cdot x|^2$ [Equation 1]

In one embodiment, the ghost target determination module 132 may compare the target peak extracted from the virtual linear array signal with a predetermined reference value, and determine the target peak below the reference value as a ghost target. Here, the predetermined reference value may mean a value capable of being set experimentally according to the manufacturing, use environment, etc. of the radar.

At this case, the ghost target determination module may compare the target peaks having the same angle to each other to determine the ghost target.

In addition, the determiner 140 may compare the real non-linear array signal of N channels with the virtual linear array signal of M+N channels to determine the ghost target. Specifically, the target peak extracting module 131 may extract the target peak from each of the real non-linear array signals of N channels and the virtual linear array signals of M+N channels. The ghost target determination module 132 may compare the extracted target peaks with each other and determine the target peak extracted from the virtual linear array signals of M+N channels is the target peak of the ghost target if the difference by the comparison is greater than or equal to a predetermined attenuation value.

The controller 150 may control the entirety of the radar operation such as generating a pulse for transmitting a radar signal and generating the target information such as the distance, direction, and length of the target from the received reflection signal.

In one embodiment, the controller 150 may generate the target information based on the target peak excluding the ghost target among the target peaks extracted from the M+N channels of the virtual linear array signal.

Figure 2A:
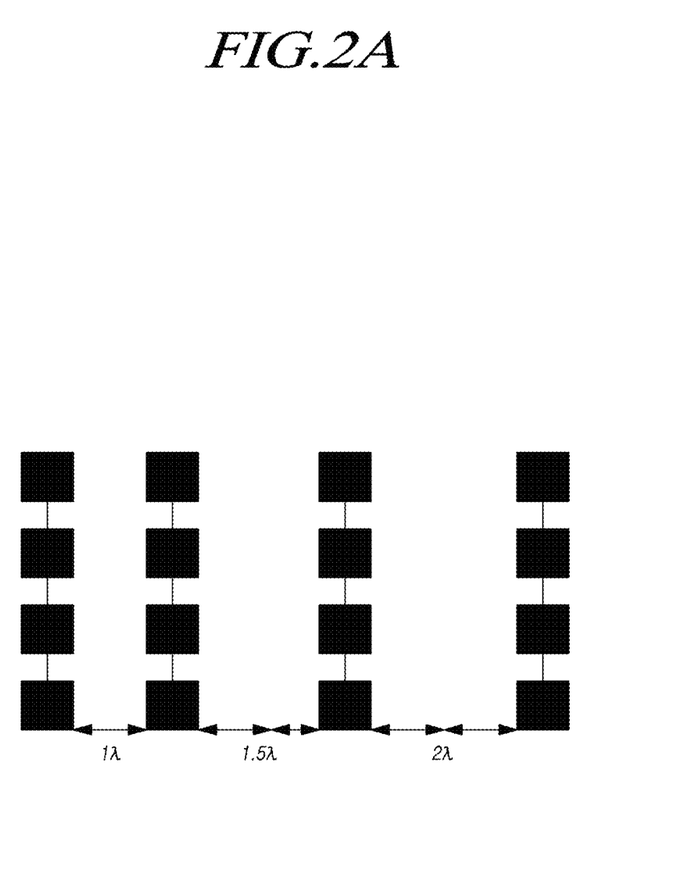
FIGS. 2A-2C are views for illustrating examples for generating virtual linear array signal in the non-linear array antenna according to the embodiment of the present disclosure.

FIG. 2A is a diagram illustrating an example of a non-linear array antenna according to an embodiment of the present disclosure.

Referring to FIG. 2A, the nonlinear array receive antennas of 4 channels are provided, and each of the nonlinear array antennas is respectively arranged at intervals of 1λ, 1.5λ, and 2λ from left adjacent array antenna. Therefore, the receiver 120 of the radar may receive the real non-linear array signals of the 4 channel signals of 0λ, 1λ, 2.5λ and 4.5λ through the non-linear array receiving antenna shown in FIG. 2A. Here, the spacing of the antennas shown in FIG. 2A is one example, but is not limited thereto.

In addition, the non-linear array receiving antenna shown in FIG. 2A may be expressed as the N channel non-uniform linear array antennas arranged at mutually different intervals.

Figure 2B:
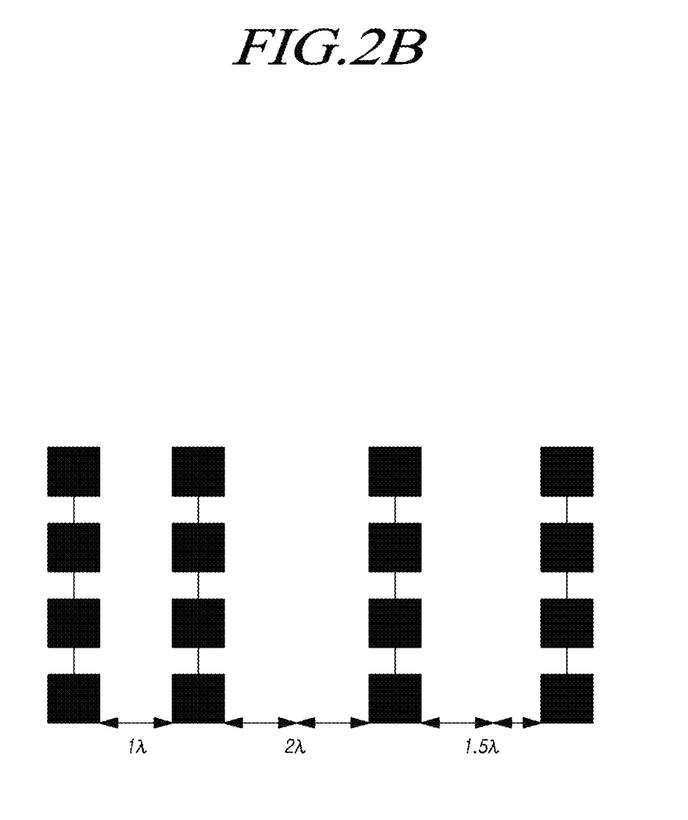

Referring to FIG. 2B illustrating another example, the nonlinear array antenna may have 4 array antennas which are arranged with 1λ, 2λ and 1.5λ intervals from left adjacent array antenna.

Thus, the receiver 120 of the radar may receive the real nonlinear array signals of the 4 channel signals of 0λ, 1λ, 3λ and 4.5λ through the nonlinear array receiving antenna shown in FIG. 2B.

Of course, as long as the receiving antenna applied to the vehicle is allowed by hardware or software, the arrangement interval of the non-linear array antenna may be configured differently, and is not limited to the arrangement shown in FIGS. 2A and 2B.

In addition, in the embodiment of FIGS. 2A and 2B, each channel is composed of one array antenna, but the present invention is not limited thereto.

Alternatively, the N-channel nonlinear array antenna may be configured such that each channel is composed of at least one array antenna.

The signal generator 130 may generate M virtual nonlinear array signals spacing equal intervals between the adjacent channels together with the N channels based on N real channel non-linear array signals. That is, as shown in FIG. 2B, it is assumed that 4 channels constituting the receiving antenna of the radar are arranged at unequal intervals or non-uniformly.

In this case, the signal generator 130 may generate M virtual channels as if they are located between N channels. As a result, the M virtual channels may be generated such that all M+N channels are equally spaced from each other with the same interval.

Figure 2C:
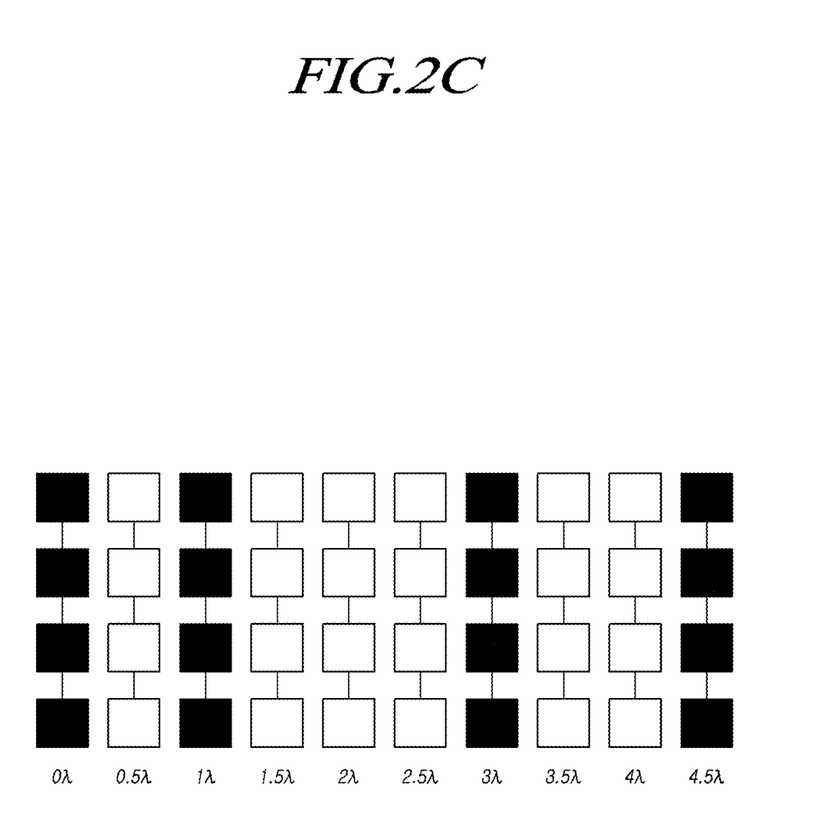

Referring to FIG. 2C, the signal generator 130 may generate M virtual channels at positions where the distance from the leftmost array antenna is 0.5λ, 1.5λ, 2λ, 2.5λ, 3.5λ, and 4λ, respectively. Therefore, all the M+N channels including the N channels by the real array antenna and the M channels by the virtual array antenna may be arranged at equal intervals of 0.5λ. Therefore, the signal generator 130 may generate the virtual linear array signal of 10 channels of 0λ, 0.5λ, 1λ, 1.5λ, 2λ, 2.5λ, 3λ, 3.5λ, 4λ and 4.5λ positions.

The determiner 140 can determine the ghost target according to the above-described method by using this virtual linear array signal.

According to an example, the controller 150 may determine the real target that excludes a target determined to be a ghost target among the detected targets from the N channel real non-linear array signals. The controller 150 may acquire information about the real target based on the real non-linear array signal or the virtual linear array signal.

Referring again to FIG. 1, the controller 150 may transmit and receive data to and from the driver assistance system (DAS) or advanced driver assistance system (ADAS) provided in the vehicle. The controller 150 may provide target information about the object to the driver assistance system 200 included in the vehicle in which the radar 100 is installed.

Here, the driver assistance system may include at least one of the autonomous driving system, the semi-autonomous driving system, the automated parking system, the blind spot detection system, the traffic alert system, the lane change (and merge) assist system, the automatic emergency braking system, the pedestrian detection system, the turn assist system and the intersection collision mitigation system. The terms and names of examples for the driver assistance systems described herein are illustrative and not restrictive.

When the controller 150 receives the request for the detection data sensed by the radar, the controller 150 may transmit the acquired target information about the real target to the driver assistance system requesting the detection data.

According to one example, the driver assistance system may further utilize the image data captured by the camera or an imaging sensor provided in the vehicle. In this case, the target information about the real target may be fused with the image data and provided to the driver assistance system.

According to an example, the controller 150 may be integrated into a domain control unit (DCU) that performs overall control of the vehicle. In this case, the controller 150 may be excluded from the radar device or operated under the control of the domain control unit. The domain control unit may be operable to process the received reflection signal to acquiring information about the object and to control one or more of the driver assistance systems based on the acquired information.

In addition, the driver assistance system may include an autonomous driving module for autonomous driving. Alternatively, the domain control unit may control the vehicle to perform the autonomous driving through the control of the individual driver assistance system modules included in the driver assistance system.

According to the embodiments of the present disclosure, the driver-assisted driving or autonomous driving of the vehicle can be performed more safely by determining the ghost target more precisely in the nonlinear array radar system.

Figure 3:
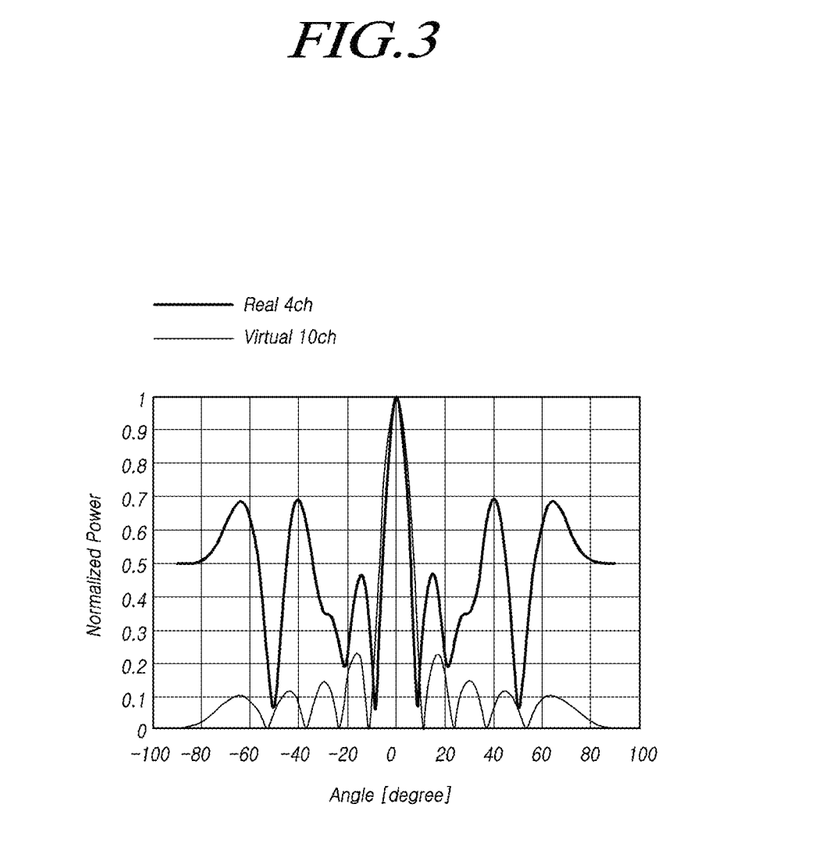
FIG. 3 is a diagram for explaining an example of ghost target determination according to an embodiment of the present disclosure.

FIG. 3 is a diagram for explaining an example of ghost target determination according to an embodiment of the present disclosure.

In FIG. 3, there are illustrated the real non-linear array signal of 4 channels and the virtual linear array signal of 10 channels generated based on the real non-linear array signal of 4 channels. Here, the horizontal axis represents the detection angle, and the vertical axis represents the magnitude of the signal.

In FIG. 3, the radar may determine the target peaks equal to or less than a predetermined reference value (e.g., 0.3) as the ghost targets among target peaks of a 10-channel virtual linear array signals.

In addition, the radar of FIG. 3 may compare the target peak extracted from each of the real nonlinear array signals of 4 channels with the target peak extracted from each of the virtual linear array signals of the 10 channels, and may determine the target peaks larger than a predetermined attenuation value (e.g., 0.2) among the extracted target peaks from the virtual linear array signals of 10 channels as a ghost target.

Therefore, only the target peak near the angle 0 may be finally determined as the real target that is not the ghost target.

Figure 4:
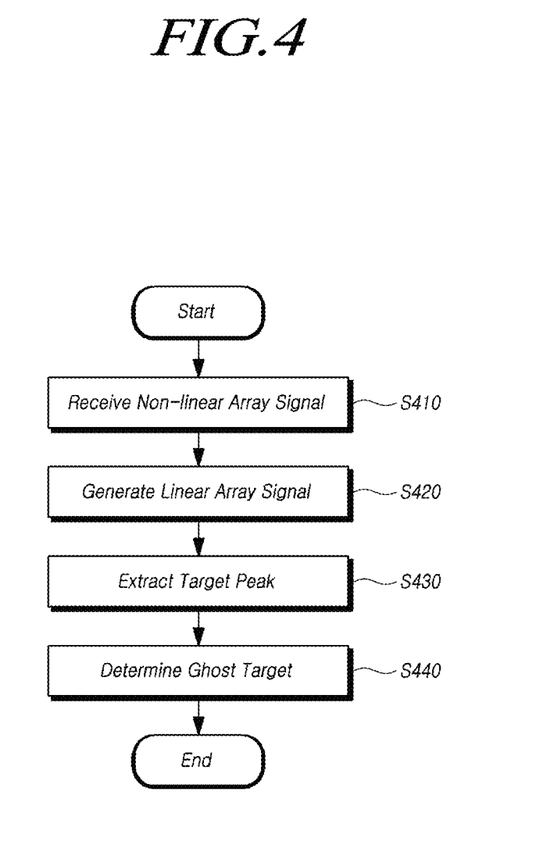
FIG. 4 is a flow chart of radar operation for determining the ghost target according to an embodiment of the present disclosure.

FIG. 4 is a flow chart of radar operation for determining the ghost target according to an embodiment of the present disclosure.

Hereinafter, the method will be described by way of example performed by the radar shown in FIG. 1, and it is apparent that the above description about the radar may be applied to the present method.

In step S410, the reflection signal is received. Specifically, the radar may receive the real nonlinear array signal which is the reflection signal through which the radar signal is returned to the radar reflected at the object and which is also the receiving signal received through the nonlinear array receiving antenna.

In step S420, the virtual linear array signal may be generated. Specifically, the radar may generate the virtual non-linear array signal of M channels based on the real nonlinear array signals of N channels received, and finally may generate the virtual linear array signal of M+N (N+M) channels.

In step S420, the target peak may be extracted. Specifically, the radar may extract the target peak by performing the fast Fourier transform for the virtual linear array signal of M+N channels.

In one embodiment, the radar may extract the target peak from a real non-linear array signal of N channels.

In step S440, the ghost target may be determined. Specifically, the radar may compare the predetermined reference value with the target peak extracted from the virtual linear array signals of M+N channels and may determine the ghost target from the all target peak.

Alternatively, the radar may compare the target peaks extracted from the real nonlinear array signals of the N channels with the target peaks extracted from the virtual linear array signals of the M+N channels, and may determine the target peak whose difference by the comparison is equal to or greater than a predetermined attenuation value as the ghost target.

Figure 5:
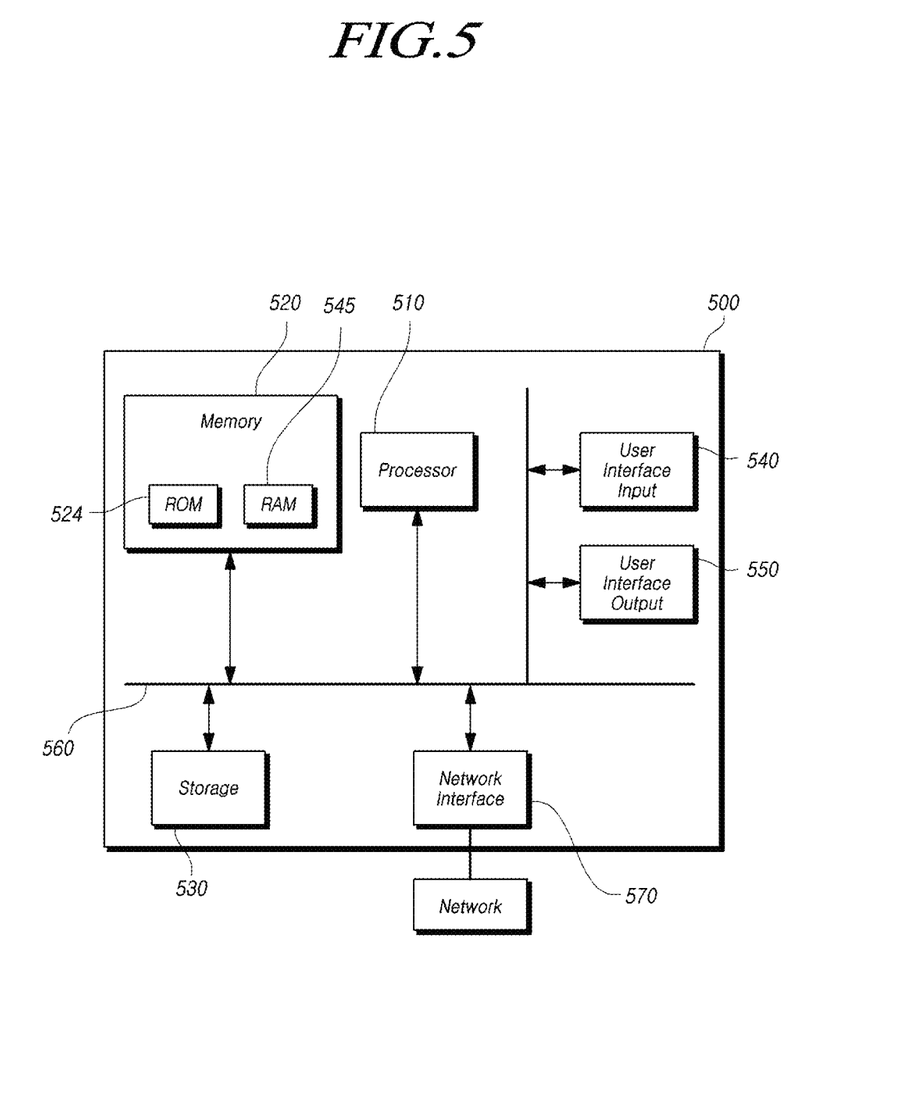
FIG. 5 is a block diagram of the radar according to another embodiment of the present disclosure.

FIG. 5 is a block diagram of the radar according to another embodiment of the present disclosure.

As shown in FIG. 5, the radar or the radar system according to the present disclosure may be implemented as a computer system 500.

At this case, the computer system 500 as the radar may include at least one or more elements of one or more processors 510, a memory 520, a storage 530, a user interface input unit 540, and a user interface output unit 550. These elements for the computer system 500 may communicate with each other via bus 560.

In addition, the computer system 500 may also include a network interface 570 for connecting to a network inside or outside the vehicle. The processor 510 may be a CPU or a semiconductor device that executes processing instructions stored in the memory 520 or the storage 530. Memory 520 and storage 530 may include various types of volatile/non-volatile storage media. For example, the memory may include a ROM 524 and a RAM 525.

In the radar having such a hardware configuration, a software or a program for performing the functions of the transmitter 110, the receiver 120, the signal generator 130, the determiner 140 and the controller 150 may be stored or installed in the memory 520 or the storage 530, and may be executed by the processor 510.

Even though all components of embodiments of the present disclosure were described as being combined in a single part or being operated in cooperation with each other, the present disclosure is not limited thereto.

That is, all the components may be selectively combined one or more parts and operated if it is within the object of the present disclosure. Further, all of the components may be implemented by single independent hardware, respectively, but some or all of the components may be selectively combined and implemented by computer programs having a program module that performs some or all of functions combined by one or more pieces of hardware. Codes or code segments constituting the computer programs may be easily inferred by those skilled in the art. The computer programs are stored in computer-readable media and read and executed by a computer, whereby embodiments of the present disclosure can be achieved. A magnetic storing medium, an optical recording medium, and a carrier wave medium may be included in the recording media of computer programs.

The above description is an example that explains the spirit of the present disclosure and may be changed and modified in various ways without departing from the basic features of the present disclosure by those skilled in the art. Accordingly, the embodiment described herein are provided not to limit, but to explain the spirit of the present disclosure and the spirit and the scope of the present disclosure are not limited by the embodiments. The protective range of the present disclosure should be construed on the basis of claims and all the technical spirits in the equivalent range should be construed as being included in the scope of the right of the present disclosure.

What is claimed is:

1. A radar apparatus comprising:
    a receiver configured to receive real non-linear array signals of N channels through N channel non-linear array antennas arranged at mutually different intervals;
    a signal generator configured to generate virtual non-linear array signals of M channels spaced at equal intervals between adjacent channels together with the N channels based on N real channel non-linear array signals, and configured to generate virtual linear array signals of M+N channels including the real non-linear array signals of N channels and the virtual non-linear array signals of M channels M channels; and
    a determiner configured to determine a ghost target based on the virtual linear array signals of M+N channels.

2. The radar apparatus of claim 1, wherein the N channel non-linear array antennas include a plurality of array antennas and each of the plurality of array antennas is composed of each channel.

3. The radar apparatus of claim 1, wherein the M channels are generated between the N channels so that the intervals between each of the M+N channels are equally spaced.

4. The radar apparatus of claim 1, wherein the determiner is configured to:
    extract a target peak from virtual linear array signals of M+N channels; and
    determine the target peak below a predetermined reference value among the extracted target peaks as the ghost target.

5. The radar apparatus of claim 4, wherein the determiner is configured to extract the target peak by using a Fourier transform.

6. The radar apparatus of claim 1, wherein the determiner is configured to:
    extract at least one target peak in each of the virtual linear array signals of M+N channels and the real non-linear array signals of N channels; and
    compare the target peak extracted from each of the virtual linear array signals of the M+N channels with the target peak extracted from each of the real nonlinear array signals of N channels, and configured to determine that the target peak extracted from the virtual linear array signals of M+N channels is the target peak of the ghost target if the difference by the comparison is greater than or equal to a predetermined attenuation value.

7. The radar apparatus of claim 6, wherein the determiner is configured to compare the target peaks having the same angle to each other to determine the ghost target.

8. The radar apparatus of claim 1, further comprising a controller configured to determine the real target excluding the target determined to be the ghost target from targets detected based on the real nonlinear array signals of N channels and configured to acquire information on the real target,
    wherein the controller provides the information on the real target to at least one of driver assistance systems (DAS) included in a vehicle in which the radar apparatus is installed.

9. The radar apparatus of claim 8, wherein the information on the real target is fused with image data captured by a camera provided in the vehicle and provided to at least one of driver assistance systems.

10. A method for controlling a radar with a nonlinear array antenna comprising:

receiving real non-linear array signals of N channels through N channel non-linear array antennas arranged at mutually different intervals;

generating virtual non-linear array signals of M channels spaced at equal intervals between adjacent channels together with the N channels based on N real channel non-linear array signals, and generating virtual linear array signals of M+N channels including the real non-linear array signals of N channels and the virtual non-linear array signals of M channels M channels; and determining a ghost target based on the virtual linear array signals of M+N channels.

11. The method of claim 10, wherein in generating virtual linear array signals of M+N channels, the M channels are generated between the N channels so that the intervals between each of the M+N channels are equally spaced.

12. The method of claim 10, wherein the determining of the ghost target comprises:

extracting a target peak from each of the virtual linear array signals of M+N channels; and determining the target peak below the predetermined reference value as the ghost target.

13. The method of claim 12, wherein the target peak is extracted by using a Fourier transform.

14. The method of claim 10, wherein the determining of the ghost target comprises:

extracting at least one target peak in each of the virtual linear array signals of M+N channels and the real non-linear array signals of N channels; and comparing the target peak extracted from each of the virtual linear array signals of the M+N channels with the target peak extracted from each of the real nonlinear array signals of N channels, and determining that the target peak extracted from the virtual linear array signals of M+N channels is the target peak of the ghost target if the difference by the comparison is greater than or equal to a predetermined attenuation value.

15. The method of claim 10, wherein the determining of the ghost target comprises comparing the target peaks having the same angle to each other to determine the ghost target.

16. The method of claim 10, further comprising:

determining a real target excluding the target determined to be the ghost target from targets detected based on the real nonlinear array signals of N channels; and acquiring information on the real target.

17. The method of claim 16, further comprising:

providing the information on the real target to at least one of driver assistance systems (DAS) included in a vehicle in which the radar apparatus is installed.

\* \* \* \* \*